United States Patent
Bertilsson et al.

(10) Patent No.: US 7,389,770 B2
(45) Date of Patent: Jun. 24, 2008

(54) APPARATUS FOR SUPPLY OF RECIRCULATED EXHAUST GAS

(75) Inventors: Bert-Inge Bertilsson, Floda (SE); Robert Vulin, Gothenburg (SE); Lennart Aberg, Stenungsund (SE)

(73) Assignee: Volvo Lastvagnar AB, Gothenburg (SE)

( * ) Notice: Subject to any disclaimer, the term of this patent is extended or adjusted under 35 U.S.C. 154(b) by 128 days.

(21) Appl. No.: 10/604,998

(22) Filed: Aug. 29, 2003

(65) Prior Publication Data

US 2004/0112345 A1    Jun. 17, 2004

Related U.S. Application Data

(63) Continuation of application No. PCT/SE02/00267, filed on Feb. 15, 2002, now abandoned.

(30) Foreign Application Priority Data

Mar. 2, 2001    (SE) .................................. 0100723

(51) Int. Cl.
F02M 25/07    (2006.01)
F02B 47/08    (2006.01)
F02B 33/44    (2006.01)

(52) U.S. Cl. ................................. 123/568.17; 60/605.2
(58) Field of Classification Search ............ 123/568.11, 123/568.17, 568.18, 568.2; 60/605.2
See application file for complete search history.

(56) References Cited

U.S. PATENT DOCUMENTS

| | | | |
|---|---|---|---|
| 1,382,285 A * | 6/1921 | Harris | 123/568.17 |
| 2,757,654 A | 8/1956 | White | 123/568.11 |
| 4,024,847 A * | 5/1977 | Koganemaru | 123/568.2 |
| 4,135,481 A * | 1/1979 | Resler, Jr. | 123/568.17 |
| 4,249,382 A | 2/1981 | Evans et al. | 60/605.2 |
| 4,445,487 A * | 5/1984 | Higashi | 123/568.17 |
| 5,207,714 A | 5/1993 | Hayashi et al. | 123/568.17 |
| 5,611,204 A | 3/1997 | Radovanovic et al. | 60/605.2 |
| 5,957,116 A | 9/1999 | Haegele et al. | 123/568.17 |
| 6,044,827 A * | 4/2000 | Pfaff et al. | 123/568.18 |
| 6,237,336 B1 | 5/2001 | Feucht et al. | 123/568.17 |
| 6,293,266 B1 * | 9/2001 | Oetting | 123/568.2 |
| 6,425,382 B1 * | 7/2002 | Marthaler et al. | 123/568.17 |
| 6,513,508 B2 * | 2/2003 | Fischer et al. | 123/568.17 |
| 6,672,292 B2 * | 1/2004 | Fischer | 123/568.17 |

FOREIGN PATENT DOCUMENTS

| | | |
|---|---|---|
| WO | WO9940312 A1 | 8/1999 |
| WO | 1020632 A1 | 7/2000 |
| WO | WO 0106109 A1 | 1/2001 |

* cited by examiner

*Primary Examiner*—Willis R Wolfe, Jr.
(74) *Attorney, Agent, or Firm*—Novak Druce + Quigg LLP

(57) ABSTRACT

Apparatus and a process for supplying recirculated exhaust gases to incoming air to a piston-type internal combustion engine. The apparatus includes a duct (2) for incoming air and a feed pipe (1) for exhaust gases and is especially well characterized in that the feed pipe (1) opens out into an outlet section (3) having at least one outlet (4) for the supply of the exhaust gases, which outlet section constitutes an outlet path (a) extended in the longitudinal direction of the duct.

10 Claims, 4 Drawing Sheets

FIG. 5a
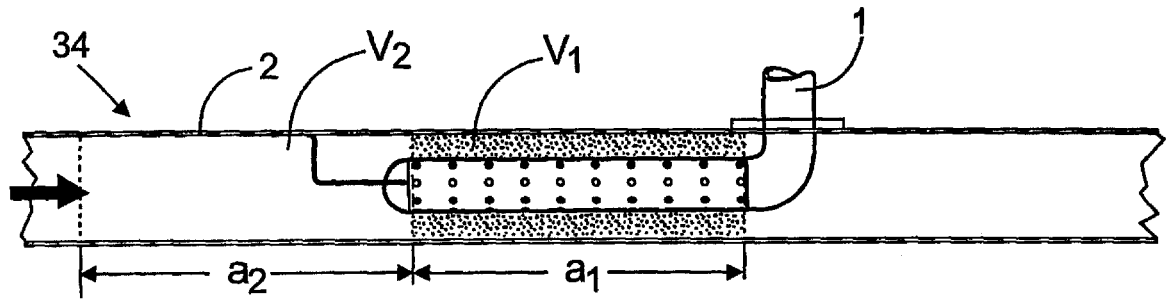
FIG. 5b
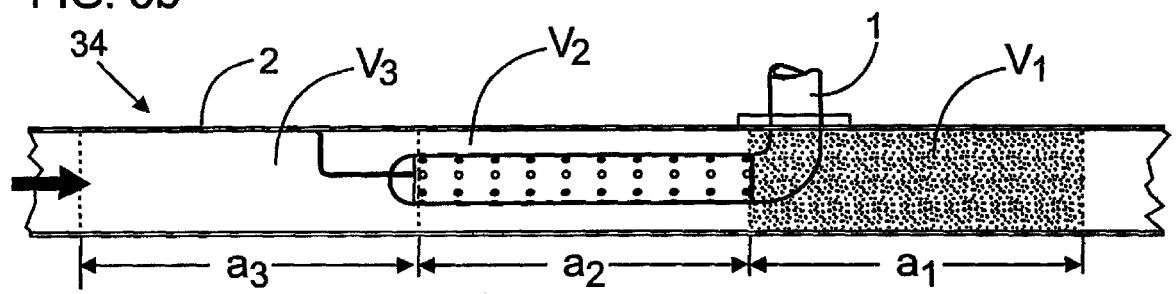
FIG. 5c
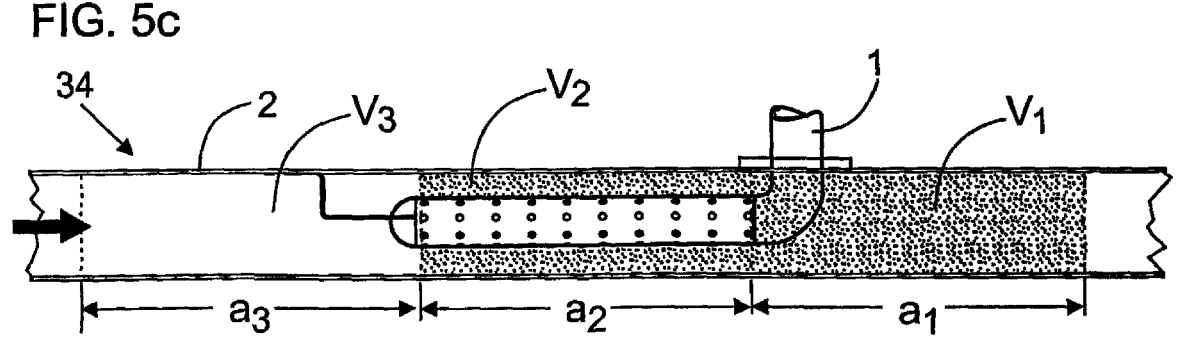
FIG. 5

APPARATUS FOR SUPPLY OF RECIRCULATED EXHAUST GAS

CROSS REFERENCE TO RELATED APPLICATIONS

This present application is a continuation patent application of International Application No. PCT/SE02/00267 filed 15 Feb. 2002 which was published in English pursuant to Article 21(2) of the Patent Cooperation Treaty, and which claims priority to Swedish Application No. 0100723-6 filed 2 Mar. 2001. Both applications are expressly incorporated herein by reference in their entireties.

BACKGROUND OF INVENTION

1. Field of the Invention

The present invention relates to an apparatus and a process for supplying recirculated exhaust gases to incoming air of a piston-type internal combustion engines; for example, Otto and diesel engines.

2. Background

Exhaust gas recirculation, also referred to by the abbreviation EGR, is known in association with internal combustion engines as a common method for beneficially influencing fuel combustion. EGR implies that a part of the total exhaust-gas flow out of the engine is recirculated, and this recirculated part-flow is introduced back into the inlet side of the engine where it is mixed with incoming air prior to entering the engine cylinders. In this way, it is possible to reduce the quantity of nitrous oxides ($NO_x$) in the exhaust gases released into the environment. This technology has been used for a relatively long time in association with otto-type engines, but interest in the process in relation to diesel engines has also grown. The technology has especially been used in vehicle applications in which the environmental requirements are relatively stringent; but with generally increasing environmental demands, interest in EGR technology is also increasing within shipping and industrial applications, for example.

The share of exhaust gas in the air/exhaust-gas mixture that is supplied to the engine cylinders has to be precisely controlled, since too small an exhaust-gas component normally produces an increased NOx production and too large an exhaust-gas component can cause a heavy increase in sooting. In order to achieve low $NO_x$ and soot emissions, it is not only important that the total exhaust-gas component be optimized, but also that the exhaust-gas component be equally large in all of the cylinders. In terms of engine wear, for example at the pistons, piston rings, linings and bearings it is important that the exhaust-gas component be the same in all cylinders. In order to obtain this even distribution of the exhaust-gas component to the various cylinders, it is important that the recirculated flow of exhaust gases be suitably mixed into the incoming air.

For simplicity's sake, in the continuation of this description the notation "EGR-flow" shall be used in a number of places for the recirculated part-flow of the total exhaust-gas flow of the engine. In addition, "EGR-pulse" denotes a pulse in the part-flow and "exhaust-gas pulse" a pulse in the total exhaust-gas flow, unless otherwise evident from the context.

Each time the exhaust valves of the cylinders are opened, a pressure pulse is created in the exhaust system resulting in an increase in the EGR-flow. In a standard internal combustion engine of the four-stroke type, the exhaust valve of the cylinder is opened every other engine revolution. Therefore, in a six-cylinder engine, for example, there are three exhaust-gas pulses per engine revolution. If the exhaust-gas branches are divided to serve three cylinders each and the EGR-flow is taken from both the exhaust-gas branches, an EGR-flow with three pulses per engine revolution is consequently obtained. If the EGR-flow is taken from one of these branches, three EGR-pulses are instead obtained for every two engine revolutions from the same engine. Depending on the engine design, the EGR system can be variously configured and the number of EGR-pulses per engine revolution can thus be lower than the total number of exhaust-gas pulses per engine revolution. The important thing, from a mixing technology viewpoint, is that the EGR-flow that is to be mixed with incoming air should be a pulse flow.

If the pulse-shaped EGR-flow is supplied to incoming air without any special mixing measures, the EGR-flow will be mixed poorly into the air resulting in the air containing "clouds" or pockets of exhaust gas. The exhaust-gas component in the air/exhaust-gas mixture (gas mixture) that is supplied to a particular cylinder will then depend on how the gas mixture outside the cylinder happens to be composed at the moment when the induction valve of the cylinder is opened. Even if the share of exhaust gases in the gas mixture, viewed in total for the entire engine, is of the desired proportion, it is very likely that the share in the various cylinders will be either too low or too high.

Usually the EGR-flow is recirculated to incoming air by a small feed pipe being connected in a known manner to the induction air duct, for example to the induction pipe directly before branch-off to the cylinders. A known method for reducing the effect of the above-mentioned "cloud" formation is to produce turbulent flows at or after the connection by, for example, using a system of small guide plates, also referred to as "turbulators," or by using various types of venturi devices. Such venturi devices utilize an underpressure in the air and can be configured, for example, such that the feed pipe is connected to a narrowed section of the air duct in which an increased airflow velocity results in a lower static pressure. In JP 200000896, an example is shown of a known technology in which turbulators are used and U.S. Pat. No. 5,611,204 discloses a number of different venturi devices. Venturi devices are known for producing a relatively good mixture of each individual exhaust-gas pulse in the incoming air. The effect of the pulsing of the EGR-flow remains, however, since the "clouds" of exhaust gas in the air/exhaust-gas mixture are well separated in the flow direction of the air current. This means that the share or proportion of exhaust gas in the gas mixture that is sucked into the various cylinders can still vary considerably and cause the problems discussed above. Apart from this drawback, many venturi devices are far too bulky to be suitable for utilization, for example, in cramped engine compartments of heavy vehicles; and moreover, such devices are relatively expensive to produce.

SUMMARY OF INVENTION

One objective of the presently disclosed invention is to provide an apparatus that causes the air/exhaust-gas mixture sucked into the various cylinders of an internal combustion engine to contain a consistent share of recirculated exhaust gas, occupy little space and be cost-effective to produce.

Another objective of the invention is to provide a process for such an apparatus which causes the air/exhaust-gas mixture sucked into the various cylinders in an internal combustion engine to contain as equal as possible a share of recirculated exhaust gases.

In one exemplary embodiment, the solution according to the invention with regard to the apparatus includes a feed pipe that emerges into an outlet section comprising (including, but not limited to) at least one outlet for the supply of the exhaust gases, which outlet section constitutes an outlet path which is extended in the longitudinal direction of the duct and the length of which is longer than the inner diameter of the feed pipe. One advantage with this solution is that the exhaust gases in the EGR-pulse are distributed to a large quantity of air even as they are supplied to the duct, for example, at the moment of supply, which is a significant advantage compared to known EGR systems. Firstly, the apparatus has the effect, firstly, that the "cloud" formation phenomenon becomes less marked since the EGR-pulse is supplied to a larger volume of air at the moment of supply. Secondly, the "clouds" are less well separated in the motional (flow) direction of the air current since the shape of such "clouds" is more stretched. Solutions configured according to the teachings of the present invention thus helps to minimize, if not obviate, the need for subsequent remixing of air and exhaust gases; i.e., after the moment of supply.

According to the prior art, the supply of the EGR-flow in the motional direction of the air current is distributed only over the path constituted by the inner diameter (or corresponding measurement for a non-circular shape) of the connecting feed pipe. In this regard, an improvement provided by the present invention is that the outlet path is extended in the longitudinal direction of the duct and is longer than the inner diameter of the feed pipe. If this path is doubled, then a significant improvement has already been achieved compared with the prior art. In a first preferred embodiment of the invention, the length of the outlet path is longer than the inner diameter of the feed pipe.

Preferably, the outlet section comprises a plurality of outlets, which are distributed in the longitudinal direction of the duct and define the outlet path. Alternatively, the outlet section comprises at least one elongated outlet, which stretches in the longitudinal direction of the duct and defines the outlet path.

If the supply of the recirculated exhaust gases is only distributed to a small part of the circumference of the air duct, for example if the exhaust gases are supplied from a standard pipe or a lengthy opening in the longitudinal direction of the duct, an uneven distribution of exhaust gases, viewed in a section running transversely to the longitudinal direction of the duct, is obtained. Under certain circumstances this can entail a risk of uneven distribution of the exhaust-gas component in the air/exhaust-gas mixture supplied to the various cylinders, which risk, inter alia, depends on the configuration of the duct downstream. In order to obtain a further improved distribution of the recirculated exhaust gases, the outlets for these are preferably also distributed along a circumference running transversely to the motional direction of incoming air. Alternatively, a plurality of elongated outlets are distributed along a circumference running transversely to the motional direction of incoming air, preferably in the form of substantially parallel slots in the longitudinal direction of the duct. A further alternative is that the at least one elongated outlet also stretches along a circumference running transversely to the motional direction of incoming air, preferably in the form of a helical slot, and alternatively a plurality of substantially parallel helical slots. A good distribution of exhaust gas, viewed in a section running transversely to the longitudinal direction of the duct, is also thereby obtained. The word circumference refers in this context not necessarily to a circular shape, but includes the shape of the duct and/or the outlet section when viewed as a section running transversely to the longitudinal direction, and can equally well be of some other geometric configuration such as, for example, square, rectangular or oval.

The invention can be configured differently in order to adapt, for example, to the shape of the duct for incoming air and the space that is available around the duct. In certain situations, the outlet section is expediently situated inside the duct for incoming air. In other situations the outlet section is more suitably situated outside the duct for incoming air. Variants are also contemplated in which the outlet section is situated both internally and externally; that is to say, variants in which the outlet section at least partially is situated on the inside, and alternatively on the outside of the duct for incoming air.

When the exhaust gases in connection with a pressure pulse are introduced into, and distributed in the outlet section, a certain fall in pressure will take place. If the outlets are evenly distributed in the outlet section, a somewhat greater quantity of exhaust gas will flow out through the outlets, or alternatively the part or parts of elongated outlets that are situated closest to the exhaust-gas inlets in the outlet section since the pressure is highest there. This produces a somewhat uneven distribution of the exhaust-gas flow out of the outlet section in the longitudinal direction and hence a somewhat uneven exhaust-gas distribution in the longitudinal direction of the air duct. In most cases, this slight unevenness in the distribution will not have any notable bearing upon the working of the engine, but under certain circumstances it may nevertheless be desirable to counteract the unevenness in the distribution. The invention can thus be further improved by expediently bringing about an increase in the effective open area of the outlet section per unit of length, in the direction of the main direction of flow of the exhaust gases in the outlet section.

Preferably, the outlets consist of holes or slots, or possibly a combination of the two. The design of the outlet section can be chosen, for example, such that holes can easily be stamped or pressed out during production. In order to increase the effective opening area of the outlet section per unit of length, slots can be gradually widened, for example; similarly, holes can either be gradually enlarged or gradually distributed closer together.

In certain situations, for example when it is difficult for space reasons to find room for a sufficiently long extended outlet path, it can be desirable to combine the invention with subsequent remixing. Expediently, at least one turbulator and/or at least one venturi device are then incorporated in the apparatus.

In another embodiment, the invention entails a process in which the supply of exhaust gas to the duct is distributed over an outlet path that extends in the longitudinal direction of the duct, and the length of which is longer than the inner diameter of the feed pipe. One advantage with this solution is that the exhaust gases in the EGR-pulse are distributed to a large quantity of air even as they are supplied to the duct; i.e., at the moment of supply, which is a significant advantage compared with the prior art. The apparatus has the effect, firstly, that the "cloud" formation phenomenon becomes less marked since the EGR-pulse is supplied to a larger volume of air and, secondly, that the "clouds" are less well separated in the motional direction of the air current, since their shape is more stretched. A solution according to the invention thus helps to minimize, if not obviate, the need for subsequent remixing of air and exhaust gases; i.e., after the moment of supply.

The length of the extended outlet path within which the supply of exhaust gas is distributed as being supplied to the duct can be related to the path that the incoming air is displaced along during the period between two exhaust-gas pulses from the engine, or between two EGR-pulses. In a preferred embodiment of the invention, the length of the outlet path extended in the longitudinal direction of the duct is at least 20% of the path that the incoming air will be displaced along in the duct during the period between two successive exhaust-gas pulses from the internal combustion engine.

A further improvement of the solution according to the invention with regard to the process is achieved by the supply of the exhaust gases to the duct being distributed along a circumference running transversely to the motional direction of incoming air. As previously explained, the word circumference refers in this context not necessarily to a circular shape but also includes other shapes such as, for example, square, rectangular or oval.

BRIEF DESCRIPTION OF DRAWINGS

The invention will be described in greater detail below with reference to the following figures, in which:

FIGS. 5a-5c are a progression of schematic diagrams showing the basic procedure for the mixing-in of recirculated exhaust gas according to the second exemplary embodiment of the invention illustrated in FIG. 3.

DETAILED DESCRIPTION

Figure 1:
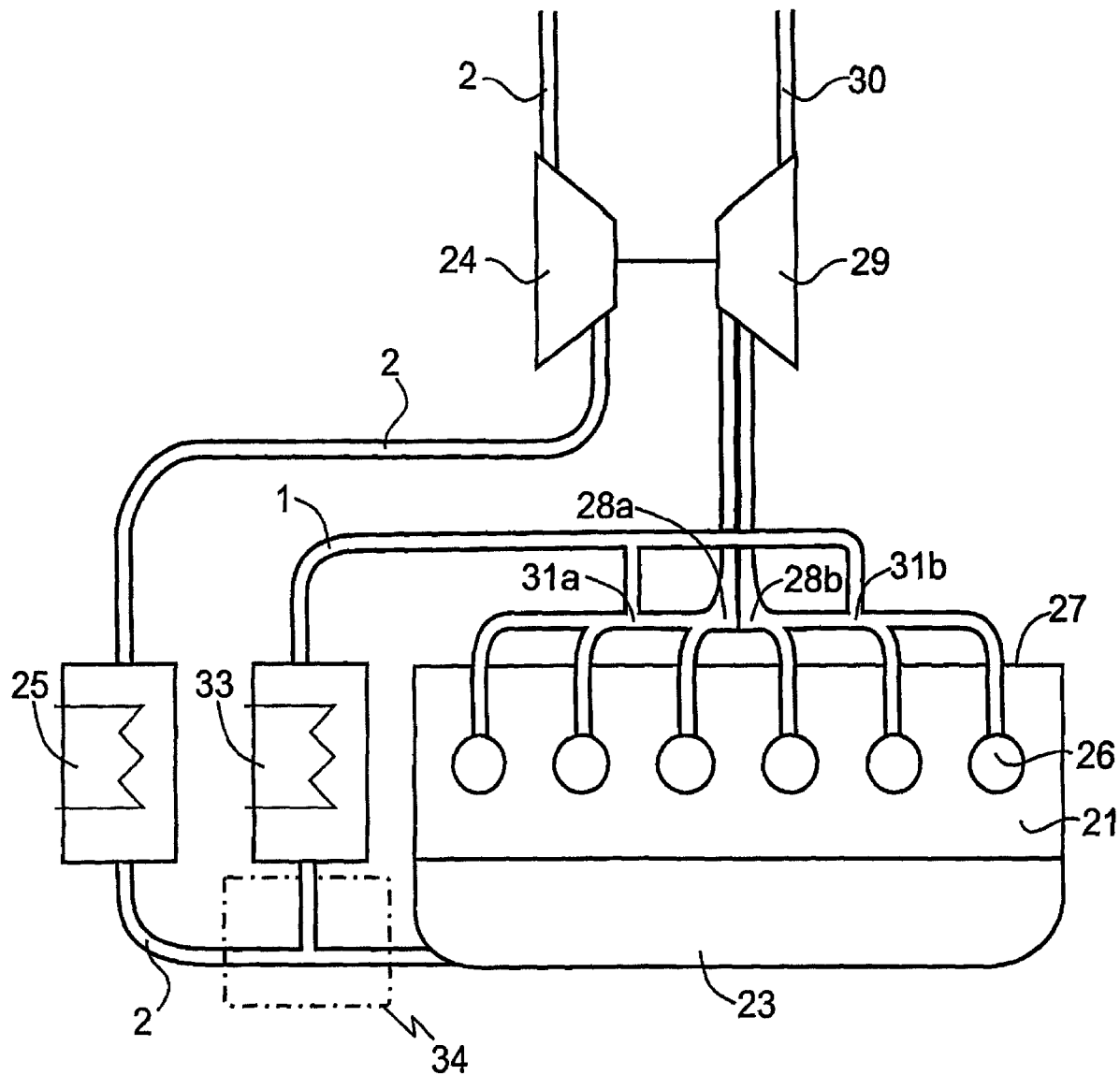
FIG. 1 is a schematic diagram of an internal combustion engine showing air and exhaust-gas flows.

FIG. 1 shows, by way of example, an outline diagram or schematic of a six-cylinder internal combustion engine and its air and exhaust-gas flows. The figure shows an example of an engine system in which the invention can be applied in order to supply a flow of recirculated exhaust gases to the incoming air of the engine. The air coming in to the engine 21 goes in a duct 2, via a compressor 24 and a cooler 25, to the inlet side 23 of the engine 21, and onward to the cylinders 26. On the outlet side 27 of the engine 21, the exhaust gases are exemplarily led through the divided branch pipe 28a, 28b, and via a turbine 29, onward to an exhaust-gas pipe 30. The turbine 29 drives the compressor 24. The flow of recirculated exhaust gases (the EGR-flow) is taken out from the divided branch pipe 28a, 28b at two places 31a, 31b. The EGR-flow is led in a common feed pipe 1, via an EGR-cooler 33, back to the inlet side 23 of the engine 21 through a connection 34 to the duct 2 for incoming air. In this example, the invention can be applied in the connection 34. Thus a feed pipe 1 for the recirculated exhaust gases and a duct 2 for incoming air are all that is required for the application of the invention.

In other variants of engine systems in which the invention is also applicable, the connection 34 can be situated anywhere else along the duct 2, for example between the compressor 24 and the cooler 25, or before the compressor 24. In still further variants, more or fewer coolers, compressors and turbines can form part of the engine system. There can also be more than one connection 34 to incoming air. The invention is also applicable for other cylinder numbers, for a different configuration of the branch pipe 28a, 28b and for different variants of how the EGR-flow is taken out from the total exhaust-gas flow of the engine.

Figure 2:
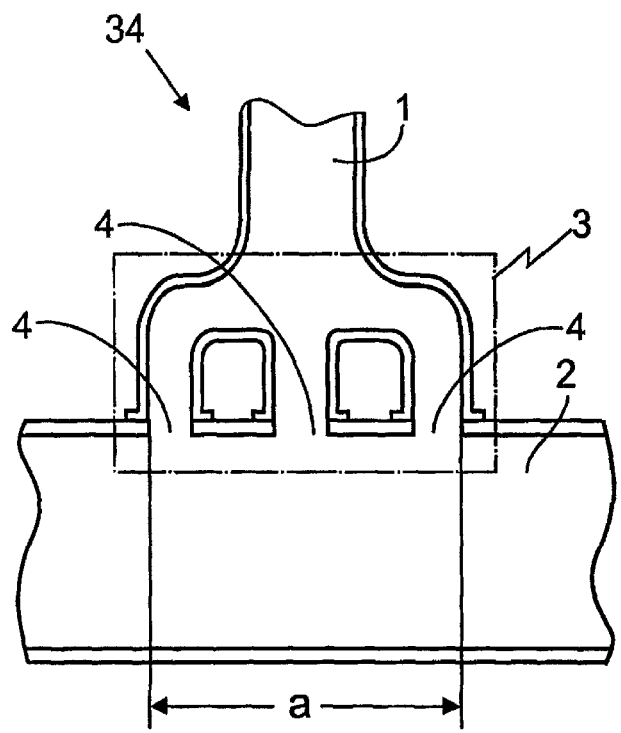
FIG. 2 is a schematic diagram of a first advantageous exemplary embodiment of the invention.

In FIG. 2, a simple form of a first advantageous exemplary embodiment of the invention is shown. In a connection 34 (according to FIG. 1), a feed pipe 1 for the pulse-shaped flow of recirculated exhaust gases opens out into an outlet section 3 provided with three outlets 4 to a duct 2 for incoming air to an internal combustion engine (not shown). The outlets 4 are distributed in the longitudinal direction of the duct and define an outlet path that extends in the longitudinal direction of the duct; i.e., the total path over which the exhaust gases are supplied to the duct 2. When an exhaust-gas pulse enters the feed pipe 1, the exhaust gases in the outlet section 3 are distributed to the various outlets 4 and supplied to the duct 2 over the outlet path extended in the longitudinal direction of the duct. Expediently, the outlet section 3 with its outlets 4 is configured such that the outflow of exhaust gases through each outlet 4 is approximately equally large. As an alternative to the three outlets 4 shown in the figure, two, or more than three outlets 4, can be distributed over the extended outlet section denoted by the letter "a." The outlets 4 can further be distributed over the whole or parts of the circumference of the duct 2. Another alternative to the three outlets 4 shown in the figure is to re-shape the interior space of the outlet section and have the exhaust gases supplied to the duct 2 through one or more elongated outlets, for example slots, which stretch in the longitudinal direction of the duct over the extended outlet path "a."

Figure 3:
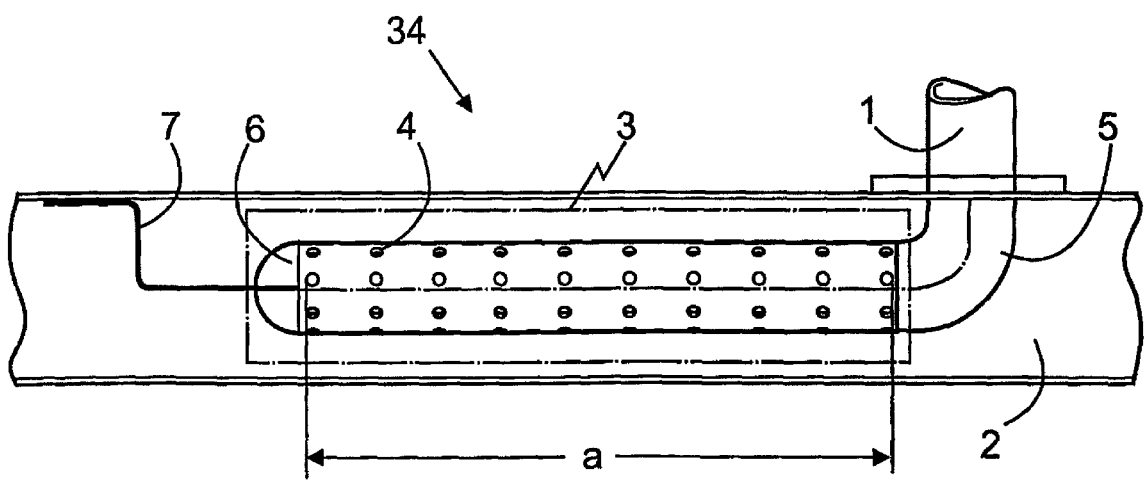
FIG. 3 is a schematic diagram of a second advantageous exemplary embodiment of the invention.

In FIG. 3, a second advantageous exemplary embodiment of the invention is shown. In a connection 34 (according to FIG. 1), a feed pipe 1 for the pulse-shaped flow of recirculated exhaust gases is connected to a duct 2 for incoming air to an internal combustion engine (not shown). The feed pipe 1 opens out, via a bend 5, into an outlet section 3 situated inside the duct 2. The outlet section 3 is provided with a plurality of outlets 4, which are distributed over an extended outlet path a in the longitudinal direction of the duct. The outlets 4 are also distributed along the circumference of the outlet section 3; i.e., along a circumference running transversely to the motional direction of incoming air. In this case, the circumference is circular but, as mentioned previously, the circumference can also have a different geometric configuration. The outlet section 3 is further provided with an end piece 6, which largely prevents the exhaust gases from flowing out axially through the end of the outlet section 3 instead of through the outlets 4. In variants of the exemplary embodiment, the end piece 6 can be removed or provided with small outlets 4. In order to stabilize the outlet section 3, a support 7 is fitted to the end piece 6 of the outlet section 3. When an exhaust-gas pulse enters the feed pipe 1, the exhaust gases are distributed in the outlet section 3 and, via its outlets 4, are supplied to the duct 2 distributed over the outlet path "a" extended in the longitudinal direction of the duct. As alternative embodiments, the bend 5 can be turned in the other direction so that the outlet section 3 is turned either towards or counter to the motional direction of the air in the duct 2. Alternatively, the feed pipe 1 can open out, for example, in the middle of the outlet section so that the exhaust gases flow in different directions in the outlet section 3 before being supplied to the duct 2 through the outlets 4. Further alternatives to the exemplary embodiment shown in FIG. 3 are to configure the outlets 4 differently; for example, the outlets can be constituted by elongated outlets, for example slots, which stretch in the longitudinal direction of the outlet section 3 over the extended outlet path "a." It is further possible to use one or more outlets 4 in the form of a helical slot which stretches both in the longitudinal direction of the outlet section 3 and along its circumference.

Figure 4:
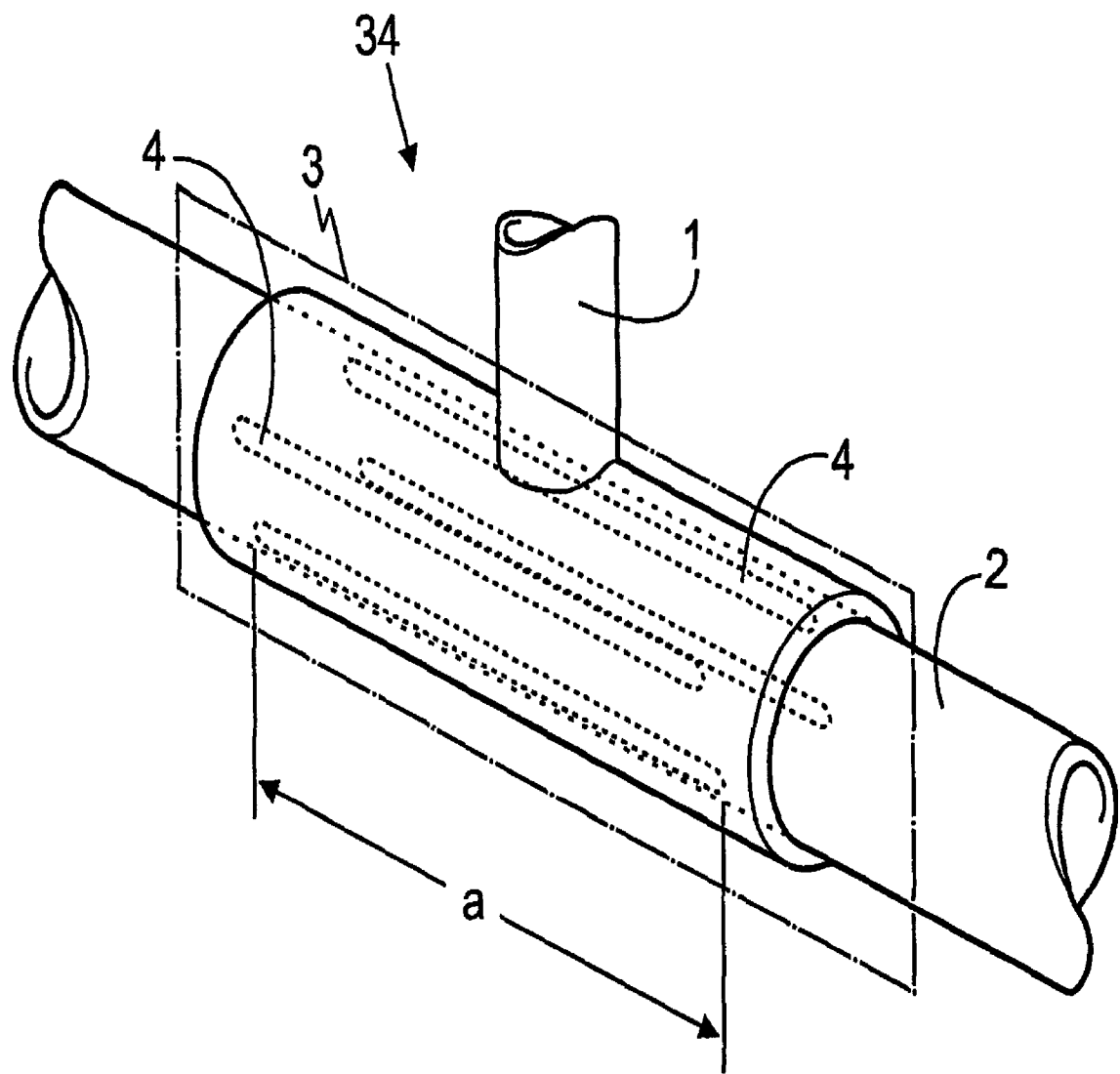
FIG. 4 is a schematic diagram of a third advantageous exemplary embodiment of the invention.

In FIG. 4 a third advantageous exemplary embodiment of the invention is shown. In a connection 34 (according to FIG. 1), a feed pipe 1 for the pulse-shaped flow of recirculated exhaust gases is connected to a duct 2 for incoming air to an internal combustion engine (not shown). The feed pipe 1 opens out into an outlet section 3 externally surrounding the duct 2. The outlet section 3 is in the shape of a hollow cylinder and is provided with a plurality of elongated outlets 4, for example slots, which stretch over an outlet path "a" extended in the longitudinal direction of the duct. The outlets 4 are also distributed along the circumference of the outlet section 3; i.e., along a circumference running transversely to the motional direction of incoming air. In this case the circumference is circular, but as previously mentioned, the circumference can have a different geometric configuration. When an exhaust-gas pulse enters the feed pipe 1, the exhaust gases are distributed in the outlet section 3 and, via its outlets 4, are supplied to the duct 2 distributed over the outlet path "a" extended in the longitudinal direction of the duct. As in the previously described exemplary embodiments, the outlets 4 can be configured differently. The elongated outlets 4 in the figure can be replaced, for example, by smaller outlets 4 which are distributed over the outlet path "a."

The outlet section with its outlets can have many different appearances. The illustrated embodiments provide examples of some variants; in the first example the outlet section is constituted by a branching of the feed pipe with outlets in the form of pipe connections, in the second example the outlet section constitutes a part of the pipe with outlets in the form of holes in the pipe wall, and in the third example the outlet section constitutes a hollow-cylindrical chamber with outlets in the form of slots in the duct wall.

In a preferred embodiment of the process according to the invention, that length of the extended outlet path over which the supply of exhaust gases to the duct is distributed is just as long as the path the incoming air will be displaced along in the duct during the period between two EGR-pulses. When this is the case, it is possible to get each cross section of the air/exhaust-gas mixture in the duct downstream of the outlet path to contain an equal-sized exhaust-gas component; this offers very good prospects for getting the air/exhaust-gas mixture which is sucked in to the various cylinders to contain an equal-sized exhaust-gas component. The basic procedure for this effective mixing-in of exhaust gases to the air duct is illustrated in FIG. 5 with reference to the second exemplary embodiment configured according to the illustration of FIG. 3. As previously described, a feed pipe 1 for the pulse-shaped flow of recirculated exhaust gases is connected to a duct 2 for incoming air to an internal combustion engine (not shown). The air flows in the direction of the arrow; i.e., to the right in the Figure. The paths $a_1$, $a_2$ and $a_3$ are equally long and correspond in length to the outlet path "a" that is extended in the longitudinal direction of the duct 2 and within which the supply of exhaust gas to the duct 2 is distributed. To each path $a_1$, $a_2$ and $a_3$ there is a corresponding duct volume $V_1$, $V_2$ and $V_3$. In FIG. 5a, an EGR-pulse has just been supplied to the volume $V_1$. The presence of exhaust gas in the duct volume is indicated by dots. In this case, the incoming air, and hence the volumes $V_1$, $V_2$ and $V_3$ will be displaced along the path "a" during the period between two EGR-pulses. This state just before the next EGR-pulse is to be supplied to the volume $V_2$ is shown in FIG. 5b. In FIG. 5c, an EGR-pulse has just been supplied to the volume $V_2$, which volume corresponds to $V_1$ in FIG. 5a. In the next sequence, the air, and hence the volumes $V_1$, $V_2$ and $V_3$, once again will be displaced along the path "a" to the right in the Figures and, after this, the next EGR-pulse will be supplied to the volume $V_3$ The mixing-in of recirculated exhaust gases to the duct 2 is thereby continued. In principle, this procedure eliminates the previously described "cloud" formation.

There may, however, be cause to make the outlet path extended in the longitudinal direction of the duct shorter than the path the incoming air will be displaced along during the period between two EGR-pulses; that is, less than 100% of the path of displacement of the air. One cause can be space reasons, such as, for example, that there is only room for an outlet path of a certain length. Another cause can be that a shorter length of outlet path quite simply produces a sufficiently good distribution of the exhaust gases in the incoming air for the engine to work as required. The effect of the outlet path being shorter than the path of displacement of the air between two EGR-pulses is that a certain interspace, containing no exhaust gas, appears between the exhaust-gas-containing volumes. Referring to FIG. 5c, this means that a certain interspace appears between the volumes $V_1$ and $V_2$. To what extent this affects the share of exhaust gas in the various cylinders depends, inter alia, on the size of the interspace and on how well air and exhaust gas are remixed during the continued flow in the duct. To make the outlet path shorter than the path of displacement of the air between two EGR-pulses is especially interesting when the EGR-flow is taken from a part-quantity of the engine cylinders. In such a case, the path of displacement of the air is extended, since the period is longer between the EGR-pulses than between the exhaust-gas pulses from the engine.

It is of interest to the invention to estimate how short, in the motional direction of the air, the outlet path of the EGR-flow in the air duct normally is within the state of the art. Diesel engines are often run with max. 15% exhaust gases in the incoming air. Since the feed pipe for the re-circulated exhaust gases is designed for this state of maximum flow, the relationship between the area for the feed pipe ($A_1$) and the area for the duct for incoming air ($A_2$) is normally on the order of 0.15 or 15 percent. If the pipe and the duct are assumed to be cylindrical, it follows according to the laws of geometry that the ratio between the diameter of the pipe ($d_1$) and the diameter of the duct ($d_2$) is the root of 0.15=0.39. The path of displacement (L) of the air in the duct between two EGR-pulses depends on the stroke volume per cylinder ($V_{cyl}$), the area of the duct ($A_2$) and from where the EGR-flow is taken. If the EGR-flow is taken from all the cylinders, the path of displacement of the air between two pulses is calculated as $L=V_{cyl}/A_2$. If the EGR-flow is taken, for example, from half of the cylinders, the time between the pulses is twice as long and consequently then becomes $L=2·V_{cyl}/A_2$. Since the length of the outlet path of the EGR-flow in the motional direction of the air is the diameter ($d_1$) of the feed pipe, a relationship between the outlet path and the path of displacement of the air can be calculated from the ratio $d_1/L$. If this ratio is calculated in percent, 10%, for example, denotes that the path of displacement is 10 times longer than the outlet path of the EGR-flow; i.e., that the EGR "clouds" are well separated in the motional direction of the air. If the EGR-flow is taken from all cylinders, the ratio can be written as $d_1/L=d_1·A_2/V_{cyl}$. As previously, $A_2$ is $=\pi·d_2^2/4$ and $d_1=0.39·d_2$ and hence it is possible to write $d_1/L=\pi·d_2^3·0.39/(V_{cyl}·4)$. By inserting typical values of $d_2$ and $V_{cyl}$, it is possible to see what the ratio $d_1/L$ normally is for the state of the art. Since a larger air flow is required for larger cylinders, $d_2$ increases with increasing $V_{cyl}$. For cylinder capacities of around 1000 cm³ $d_2$ is typically 7-7.5 cm, for 2000 cm³ circa 8 cm, and for 3000 cm³ circa 9 cm. If these values are inserted in the term for $d_1/L$, it can be seen that the outlet path of the EGR-flow normally constitutes around 10% or less of the path of displacement of the air between two exhaust-gas pulses. If the EGR-flow is not taken from all cylinders, the value of $d_1/L$ is even lower; i.e., the inlet path constitutes an even smaller part of the path of displacement of the air. In other words, a considerable improvement is achieved compared with the state of the art as soon as the outlet path reaches 20% of the path of displacement of the air. Expediently, the length of the outlet path extended in the longitudinal direction of the duct is therefore at least 20% of the path the incoming air will be displaced along in the duct during the period between two successive exhaust-gas pulses from the internal combustion engine.

The invention should not be regarded as being limited to the depicted exemplary embodiments; rather, a series of modifications are conceivable without having to depart for that reason from the scope of the patent protection.

The invention claimed is:

1. An apparatus for supplying recirculated exhaust gases to incoming air of a piston-type internal combustion engine, said apparatus comprising:
   a duct (2) for incoming air and a feed pipe (1) for exhaust gases and which includes an outlet section (3) inside the duct (2);
   said outlet section (3) comprising at least one outlet (4) for distributed supply of exhaust gases and said outlet section (3) constitutes an outlet path (a) that extends in the longitudinal direction of the duct (2) and the length of which is longer than an inner diameter of the feed pipe (1), wherein the at least one outlet (4) is plurality of elongated outlets (4) distributed along a circumference running transversely to the motional direction of incoming air in the form of substantially parallel slots in the longitudinal direction of the duct (2); and
   said outlet path (a) has a length that is at least twice as long as the inner diameter of the feed pipe (1) whereby it is possible for an exhaust-gas pulse transported through the feed pipe (1) to be distributed into a portion (a1) of incoming air which, in the duct (2), passes the outlet section (3).

2. An apparatus for supplying recirculated exhaust gases to incoming air of a piston-type internal combustion engine, said apparatus comprising:
   a duct (2) for incoming air and a feed pipe (1) for exhaust gases and which includes an outlet section (3) inside the duct (2);
   said outlet section (3) comprising at least one outlet (4) for distributed supply of exhaust gases and said outlet section (3) constitutes an outlet path (a) that extends in the longitudinal direction of the duct (2) and the length of which is longer than an inner diameter of the feed pipe (1), wherein the at least one outlet (4) is at least one elongated outlet (4) extending along a circumference running transversely to the motional direction of incoming air in the form of a helical slot; and
   said outlet path (a) has a length that is at least twice as long as the inner diameter of the feed pipe (1) whereby it is possible for an exhaust-gas pulse transported through the feed pipe (1) to be distributed into a portion (a1) of incoming air which, in the duct (2), passes the outlet section (3).

3. An apparatus for supplying recirculated exhaust gases to incoming air of a piston-type internal combustion engine, said apparatus comprising:
   a duct (2) for incoming air and a feed pipe (1) for exhaust gases and which includes an outlet section (3) inside the duct (2);
   said outlet section (3) comprising at least one outlet (4) for distributed supply of exhaust gases and said outlet section (3) constitutes an outlet path (a) that extends in the longitudinal direction of the duct (2) and the length of which is longer than an inner diameter of the feed pipe (1), wherein the at least one outlet (4) is at least one elongated outlet (4) extending along a circumference running transversely to the motional direction of incoming air in the form of a plurality of substantially parallel helical slot; and
   said outlet path (a) has a length that is at least twice as long as the inner diameter of the feed pipe (1) whereby it is possible for an exhaust-gas pulse transported through the feed pipe (1) to be distributed into a portion (a1) of incoming air which, in the duct (2), passes the outlet section (3).

4. A process for supplying recirculated exhaust gases to incoming air to a piston-type internal combustion engine, which internal combustion engine comprises a duct (2) for incoming air and a feed pipe (1) for said exhaust gases, the supply of the exhaust gases to the duct (2) is also distributed along a circumference running transversely to the motional direction of incoming air to be distributed over an outlet path (a) which is extended in the longitudinal direction of the duct and the length of which is longer than the inner diameter of the feed pipe (1), the length of the outlet path (a) extended in the longitudinal direction of the duct is approximately as long as the path the incoming air will be displaced along in the duct (2) during the period between two successive exhaust-gas pulses in the flow of said recirculated exhaust gases.

5. A process for supplying recirculated exhaust gases to incoming air to a piston-type internal combustion engine, which internal combustion engine comprises a duct (2) for incoming air and a feed pipe (1) including an outlet section (3) for said exhaust gases, the supply of the exhaust gases to the duct (2) being distributed over an outlet path (a) which is extended in the longitudinal direction in the duct and the length of which is longer than the inner diameter of the feed pipe (1), the length of the outlet path (a) extended in the longitudinal direction of the duct is at least 80% of the path the incoming air will be displaced along in the duct (2) during the period between two successive exhaust-gas pulses from said internal combustion engine.

6. The process as recited in claim 5, wherein the length of the outlet path (a) extended in the longitudinal direction of the duct is approximately 100% of the path of the incoming air.

7. The process as claimed in claim 5, wherein the length of the outlet path (a) extended in the longitudinal direction of the duct is approximately as long as the path the incoming air will be displaced along in the duct (2) during the period between two successive exhaust-gas pulses in the flow of said recirculated exhaust gases.

8. The process as claimed in claim 7, wherein the supply of the exhaust gases to the duct (2) is also distributed along a circumference running transversely to the motional direction of incoming air.

9. The process as claimed in claim 8, wherein the supplied exhaust gases are remixed in the duct (2) with the aid of at least one turbulator device.

10. The process as claimed in claim 8, wherein the supplied exhaust gases are remixed in the duct (2) with the aid of at least one venturi device.

* * * * *